June 24, 1941.  C. K. ROOS  2,246,987
CONTINUOUS MOLDING APPARATUS
Filed Oct. 23, 1937  2 Sheets-Sheet 1
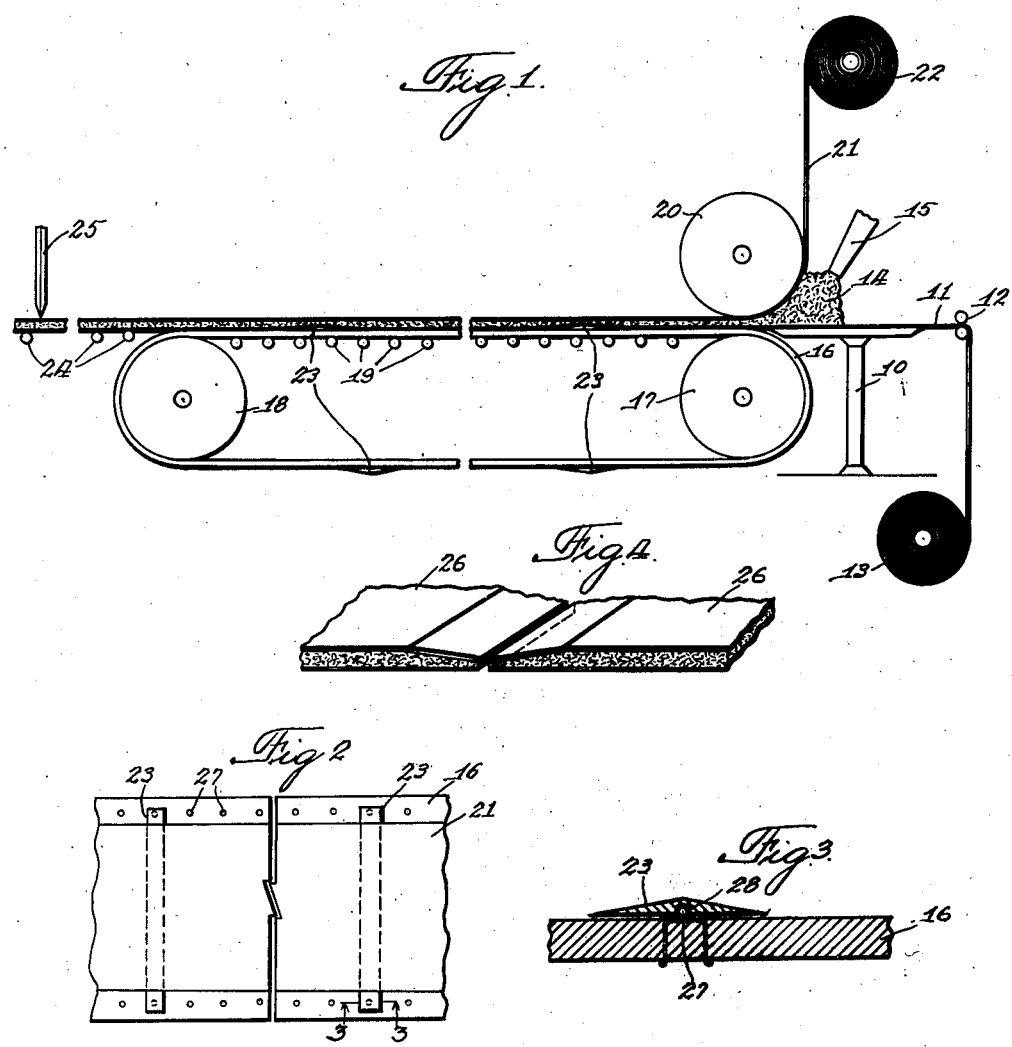
Inventor:
Carlisle K. Roos.

June 24, 1941.  C. K. ROOS  2,246,987
CONTINUOUS MOLDING APPARATUS
Filed Oct. 23, 1937  2 Sheets-Sheet 2
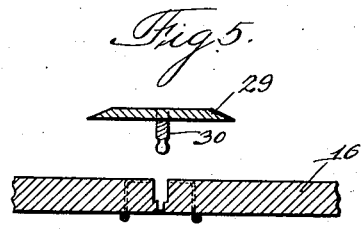
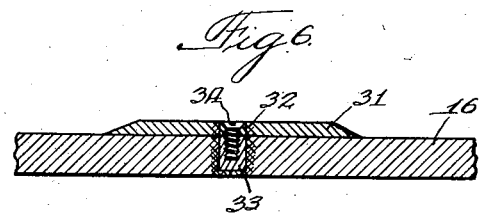
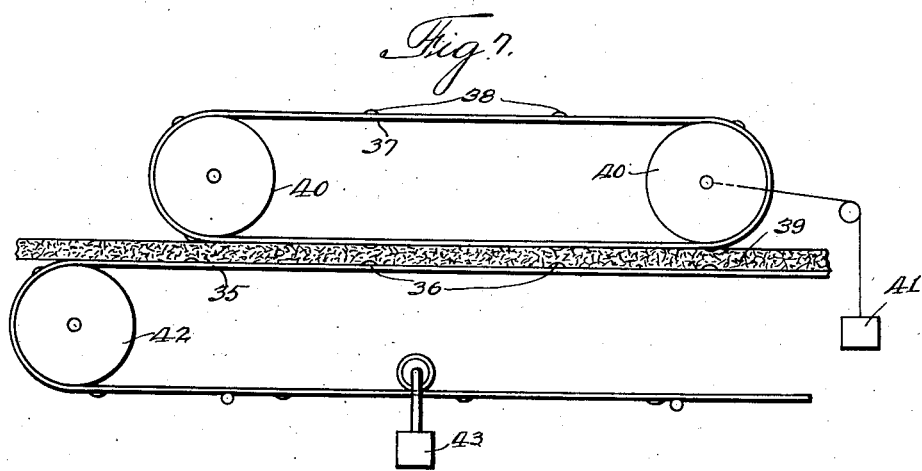
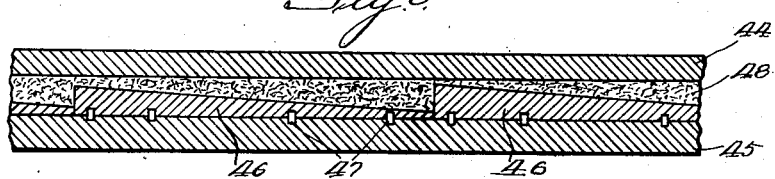
Inventor:
Carlisle K. Roos
By Amy, Thien, Olan & Micklebury
Attys.

Patented June 24, 1941

2,246,987

UNITED STATES PATENT OFFICE 2,246,987

CONTINUOUS MOLDING APPARATUS

Carlisle K. Roos, Wheaton, Ill., assignor to United States Gypsum Company, Chicago, Ill., a corporation of Illinois Application October 23, 1937, Serial No. 170,528

4 Claims. (Cl. 154—1)

My invention relates to an apparatus for manufacturing sheet materials by a continuous molding process from moldable or plastic compositions, more particularly to an apparatus for manufacturing plaster board or wallboard, and has for an object the provision of a simple, reliable and inexpensive apparatus for carrying out the process.

Apparatus for carrying out continuous molding processes for producing sheet materials such as plaster board, fiber insulation board, oxychloride cement bond insulation products, and the like, are well known in the art. It is likewise well known to produce sheet materials of this type having beveled or recessed longitudinal edges, the recessed edges being formed while the material is still in its plastic or manageable state. The principal advantage of beveled or recessed edges in wallboards of this character is found in the facility with which attractive joints may be provided between adjacent boards, and it has heretofore been appreciated that a similar advantage is to be found in wallboards having beveled ends as well as beveled longitudinal edges.

The production of beveled or recessed ends in a continuous process is somewhat more difficult than the provision of beveled or recessed edges, and prior attempts to produce beveled-end materials in an economical and practical manner have not been entirely successful. Such prior attempts have been somewhat unsatisfactory due to the fact that the character of the apparatus necessitated major changes in the standard equipment utilized for forming square-end materials. Furthermore, such prior art arrangements are not, insofar as I am aware, readily adaptable to the production of beveled-end units of various lengths and widths. Accordingly, something is yet to be desired in apparatus of this type, and it is a further object of my invention to provide an apparatus for producing in a continuous and economical manner, beveled or recessed-end sheet material units.

A still further object of my invention is to provide an apparatus of this character, the production of which involves only slight changes in the standard equipment heretofore used, and which apparatus is sufficiently flexible in its construction and operation to provide for the manufacture of units of various lengths and widths.

In carrying out my invention in one form, I provide a continuously movable conveyor, means for supplying to the conveyor a formed plastic mass, and means carried by the conveyor for forming transversely extending depressions in the formed plastic mass at predetermined spaced intervals, the conveyor and the depression-forming means being arranged to support the formed plastic mass for a sufficient period of time to permit the mass to attain such a degree of rigidity as to retain permanently the transversely extending depressions.

More specifically, the depression-forming means includes a plurality of bars having fastening means adapted to engage cooperating fastening means on the conveyor so that the bars are secured thereto in spaced relation. Thus a quick-detachable connection is provided for securing the bars to the surface of the conveyor so that the bars are forced into the plastic mass on the conveyor to form depressions therein, and means are provided for severing the plastic mass along the center-lines of the depressions after the plastic mass has set or hardened, whereby plaster boards having beveled or depressed ends are formed.

For a more complete understanding of my invention, reference should now be had to the drawings in which:

Figure 1 is a somewhat diagrammatic elevational view of an apparatus embodying my invention;

Fig. 2 is a fragmentary plan view of a portion of the conveyor shown in Fig. 1;

Fig. 3 is a fragmentary sectional view taken along the line 3—3 of Fig. 2;

Fig. 4 is a fragmentary perspective view of a pair of beveled-end plaster boards formed in accordance with my invention;

Figs. 5 and 6 are fragmentary sectional views similar to Fig. 3, showing further embodiments of my invention;

Fig. 7 is a somewhat diagrammatic elevational view of an apparatus constituting a further embodiment of my invention; and Fig. 8 is a fragmentary sectional view illustrating a still further embodiment of my invention.

Referring now to Figs. 1 to 4. inclusive, I have shown my invention as applied to an apparatus for manufacturing plaster board of the type having a core of gypsum or other hydrated composition, and inner and outer covering sheets or liners of suitable fibrous material, such for example as paper. As shown, the apparatus includes a table or support 10 over which a bottom cover sheet or liner 11 is passed, a pair of feed rolls 12 being effective to withdraw the sheet 11 from a suitable supply roll 13. As the bottom cover sheet 11 passes over the support 10 a plastic body or mass 14, which preferably constitutes a body of gypsum or other hydrated composition in its plastic or manageable state, is deposited on the sheet 11 in any suitable manner, as for example from the supply spout 15.

Adjacent the forward edge of the support 10 I provide a conveyor which constitutes an endless belt or carriage 16 supported on suitable driven rollers 17 and 18, the upper portion of the conveyor being provided with a plurality of supporting rolls 19. As the cover sheet 11 and the plastic mass 14 pass to the conveyor, a suitable master roll 20 operates on the plastic mass to supply to the conveyor a formed plastic mass of predetermined thickness, an upper cover sheet 21 being drawn from a suitable supply roll 22 and applied to the upper surface of the formed plastic mass by the master roll 20.

The apparatus thus far described is entirely conventional and is of the type commonly employed in the art of forming plaster board of this character, and although I have shown the conveyor belt 16 as arranged to cooperate with the master roll 20 properly to form the plastic mass 14 between the cover sheets 11 and 21, it will of course be understood that a lower master roll may be provided which is entirely separate from the conveyor. Likewise, although I have shown an apparatus for producing open or raw edge plaster board, it will of course be understood that my invention is not limited thereto and may be applied with equal facility to apparatus for forming closed edge plaster board, in which case suitable means are provided in advance of the master roll for properly scoring and folding the lower cover sheet 11 so as completely to enclose the edges of the plaster board. It will furthermore be understood that my invention may be applied to apparatus including means for providing beveled or recessed longitudinal edges on the plaster board, and that the edge-beveling means is omitted from Fig. 1 in order to simplify the drawings.

In order to produce in a continuous manner sheet material or plaster board units having beveled or recessed ends, the conveyor belt 16 is provided, in accordance with my invention, with a plurality of bars 23 which are secured to the outer surface of the belt at spaced intervals so as to form depressions in the formed plastic mass as it passes over the belt, the weight of the plastic mass being sufficient to force the bottom cover sheet 11 inwardly so as to form the desired depressions in the plastic mass, which is in its moldable or plastic state.

The conveyor 16 is of sufficient length and moves at a predetermined speed so that the formed plastic mass is supported by the belt 16 and the bars 23 for a sufficient period of time to permit the formed plastic mass to harden or set so that the depressions are permanently retained therein. From the conveyor belt 16 the formed sheet is passed to suitable rollers 24 or slat conveyors, and is fed to suitable cutting means represented by the cutting knife 25, which cutting means is arranged to sever the formed sheet along the center-lines of the transverse depressions formed by the bars 23. It will of course be understood that the cutting means 25 is so synchronized with the movement of the plastic mass as to sever proper lengths of the formed sheet, and since such synchronizing means are well known in the art it is not believed necessary to illustrate the same herein.

As shown best in Fig. 3, the transverse bars 23 are preferably triangular or wedge-shaped so as to form a depression having tapered walls, whereby beveled-end units 26 having tapered ends (Fig. 4) are formed when the continuously progressed sheet is severed along the center-lines of the depressions.

Although the bars 23 may be secured to the conveyor belt 16 in any desired manner, I prefer to provide the conveyor belt with a plurality of snap fasteners 27 arranged to be selectively engaged by cooperating fastening means 28 on the bars 23. As shown, the fasteners 27 are arranged at predetermined intervals along the edges of the conveyor belt 16, and it will be apparent that the spacing of the bars 23 may be varied simply by engaging the fastening means 28 on the bars with the desired ones of the fastening means 27. Preferably, the distance between the fastening means 27 on the belt 16 is selected as a small multiple of the more commonly encountered sheet lengths so as to provide for the manufacture of various standard lengths with a single apparatus. The bars 23 may be formed of any suitable rigid material, such for example as metal, wood, hard rubber, and the like, or if desired flexible material such as sponge rubber may be used. When flexible bars are utilized, however, it is necessary to provide a plurality of fasteners spaced transversely across the belt 16 in order to prevent relative movement of the bars with respect to the belt.

It will of course be apparent that the arrangement of the fastening means 27 and 28 on the belt 16 and the bars 23, respectively, may be varied as desired, and that the shape and size of the transverse bars themselves may be varied to produce any desired type of depression. Thus, in Fig. 5 I have shown a bar 29 having a substantially flat top and tapered sides, the bar 29 being provided with the male portion 30 of the fastening means for cooperating with the female portion carried by the belt 16. With this arrangement the belt or conveyor presents a smooth flat surface which is suitable for the production of a molded product without beveled or recessed ends. In Fig. 6 I have shown an arrangement in which a bar 31, similar in shape to the bar 29 of Fig. 5, is provided with a threaded insert 32, the belt 16 being provided with a similar threaded insert 33 for receiving a fastening screw 34, the head of which is countersunk in the insert 32.

The provision of quick-detachable fastening means for securing the depression-forming bars to the conveyor belt constitutes an important feature of my invention, but I do not wish to be limited to the specific fastening means shown, since various other arrangements may be provided. For example, the forming bars may be provided with tiny vacuum cups or may be stapled or adhesively attached to the conveyor belt. In each case it is necessary that the attaching or fastening means possess sufficient strength to maintain the bars permanently in contact with the moving belt, as otherwise difficulty may be encountered in obtaining uniform bevel.

The size and shape of the depression produced in the formed plastic mass as it is carried along by the conveyor depends entirely upon the design of the forming bar or ridge, and the depth or extent of the depression is limited only by the material used in forming the bar or ridge and by the nature of the material constituting the plastic mass. Should it be necessary to produce a relatively deep depression, an additional belt may be provided directly above the plastic mass for exerting a moderate pressure thereon so that the material is forced around the bars or ridges into the desired shape or form. If pressures of relatively great magnitude are required properly to form the plastic mass about the bars or ridges, additional bars may be attached to the belt extending longitudinally thereof for engaging the edges of the plastic mass so that the mass is completely confined between the upper and lower conveyors and the longitudinally extending bars. With such an arrangement pressures of considerable magnitude may be exerted on the plastic mass.

In Fig. 7 I have shown an apparatus embodying my invention for producing fibrous insulation board, which apparatus consists of a lower conveyor belt 35 having suitable bars or ridges 36 arranged at spaced intervals thereon, and an upper conveyor belt 37 having similar bars or ridges 38. In this embodiment of my invention the plastic or moldable body 39 which passes between the belts 35 and 37, is shown as constituting a felted sheet or mass which may be produced in a conventional felting machine, such as a Fourdrinier or a cylinder machine. As shown, the bars 36 and 38 are arranged to provide depressions in both the upper and lower surfaces of the sheet 39 to form depressions directly opposite each other in the upper and lower surfaces of the sheet so as to provide wallboards both surfaces of which are beveled at the ends thereof. It will of course be understood that from the conveyors 35 and 37 the felted sheet 39 passes to suitable cutting means (not shown) arranged to sever selected lengths of the sheet.

In case a depression is desired on one side only of the felted sheet 39, the bars 38 may be removed from the belt 37 so as to present a smooth surface to the upper face of the material 39. The conveyor belt 37 is carried by suitable pulleys 40 which are maintained under tension by any suitable means, as for example by a weight 41, and the lower belt 35 which passes over pulleys 42, only one of which is shown, is maintained under tension by a suitable weight 43.

As mentioned above in connection with Fig. 1, the conveyors are arranged to support the sheet 39 for a sufficient interval of time to permit the sheet to dry or harden, and if desired means may be provided for subjecting the sheet 39 to a blast of hot air so as to assist in drying the sheet to cause hardening or setting thereof as it passes between the conveyors.

Although my invention is particularly applicable to the production of beveled or recessed-end plaster board or insulation board, as described above, it is not limited thereto and may also be applied to the production of sheet material units from other suitable moldable materials such as asphalt, glass, and similar plastics. In Fig. 8 I have shown somewhat diagrammatically an apparatus embodying my invention adapted to be used in the production of asbestos cement shingles. As shown, this apparatus includes an upper conveyor belt 44 and a cooperating lower conveyor belt 45 to which a plurality of bars 46 are secured by suitable fastening means 47. These bars 46 are so shaped that when a plastic mass of asbestos cement 48 is fed between the belts by any suitable means, a plurality of thick butt asbestos cement shingles are produced in a continuous sheet, which sheet may thereafter be severed at predetermined points to produce individual shingles.

The various conveyor belts shown, such for example as the belt 16, may of course be formed of any suitable material such as rubber, fabric, screen, felt, steel, etc., and while I have used the word "belt" in describing the conveyors I do not wish to be limited to conveyors of the type utilizing a continuous flexible belt, as obviously a belt or tread consists of interlocking pieces, commonly known as "caterpillar treads" may be utilized and provided with suitable fastening means for attaching the forming bars thereto.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patents is:

1. In a wallboard manufacturing apparatus including a conveyor and forming means for supplying to said conveyor a formed plastic mass, the combination of fastening means disposed at spaced intervals along the opposite edges of said conveyor and a plurality of forming bars having cooperating fastening means adjacent the opposite ends thereof for selectively engaging selected oppositely disposed fastening means on said conveyor, whereby said bars may be selectively secured to said conveyor in transverse relation thereto to form transverse recesses in one surface of said plastic mass at selected intervals.

2. In a wallboard manufacturing apparatus including a conveyor and forming means for supplying to said conveyor a formed plastic mass, the combination of a plurality of longitudinally spaced fastening means associated with said conveyor and a plurality of forming bars having cooperating fastening means for selectively engaging said first mentioned fastening means and for securing said bars in transverse relation to said conveyor thereby to form transverse recesses in one surface of said plastic mass at selected intervals.

3. In a wallboard manufacturing apparatus including a conveyor and forming means for supplying to said conveyor a formed plastic mass, the combination of a plurality of longitudinally spaced fastening means associated with said conveyor and a plurality of forming bars of substantially triangular cross-section having cooperating fastening means for selectively engaging said first mentioned fastening means and for securing said bars in transverse relation to said conveyor thereby to form transversely extending, tapered depressions in one surface of said plastic mass at selected intervals.

4. In a wallboard manufacturing apparatus including a conveyor and forming means for supplying to said conveyor a formed plastic mass, the combination of a plurality of longitudinally spaced resilient fastening means associated with said conveyor and a plurality of forming bars having cooperating, quick-detachable fastening means for selectively and resiliently engaging said first mentioned fastening means and for securing said bars in transverse relation to said conveyor, thereby to form transverse recesses in one surface of said plastic mass at selected intervals.

CARLISLE K. ROOS.